United States Patent
Pillhoefer et al.

[11] Patent Number: 6,120,843
[45] Date of Patent: Sep. 19, 2000

[54] METHOD AND APPARATUS FOR GAS PHASE DIFFUSION COATING OF WORKPIECES MADE OF HEAT RESISTANT MATERIAL

[75] Inventors: Horst Pillhoefer, Roehrmoos; Martin Thoma, Munich, both of Germany

[73] Assignee: MTU Motoren- und Turbinen-Union Muenchen GmbH, Munich, Germany

[21] Appl. No.: 09/114,972

[22] Filed: Jul. 13, 1998

[30] Foreign Application Priority Data

Jul. 12, 1997 [DE] Germany ............... 197 30 007

[51] Int. Cl.⁷ .................................................. C23C 16/08
[52] U.S. Cl. ...................................... 427/253; 148/283
[58] Field of Search .................. 427/252, 253; 148/283

[56] References Cited

U.S. PATENT DOCUMENTS

| | | |
|---|---|---|
| 2,816,048 | 12/1957 | Galmiche . |
| 3,486,927 | 12/1969 | Gauje ............................ 427/253 |
| 3,667,985 | 6/1972 | Levine et al. . |
| 3,958,047 | 5/1976 | Baldi . |
| 4,687,684 | 8/1987 | Restall et al. ............... 427/253 |
| 4,935,193 | 6/1990 | Grunke et al. . |
| 4,936,927 | 6/1990 | Grunke et al. . |
| 5,071,678 | 12/1991 | Grybowski et al. . |
| 5,215,785 | 6/1993 | Strasser et al. . |
| 5,221,354 | 6/1993 | Rigney . |
| 5,308,399 | 5/1994 | Pillhoefer et al. . |
| 5,455,071 | 10/1995 | Pillhoefer et al. ............ 427/253 |

FOREIGN PATENT DOCUMENTS

| | | |
|---|---|---|
| 0064805 | 11/1982 | European Pat. Off. . |
| 0184354 | 8/1988 | European Pat. Off. . |
| 0480867 | 4/1992 | European Pat. Off. . |
| 0731187 | 9/1996 | European Pat. Off. . |
| 1135015 | 11/1968 | United Kingdom . |
| 2256876 | 12/1992 | United Kingdom . |

*Primary Examiner*—Timothy Meeks
*Attorney, Agent, or Firm*—W. F. Fasse; W. G. Fasse

[57] ABSTRACT

In a method for coating workpieces with a coating material by a gas phase diffusion coating process, the coating material is conveyed in the form of a metal halide compound from a coating material source (9A, 9B, 9C) to the workpiece (7) by means of a metal halide gas circulation flow (F). The gas circulation flow (F) is physically induced due to convection by establishing a temperature gradient between the workpiece (7) and the coating material source (9A, 9B, 9C), and is reinforced by the chemical reactions taking place. An apparatus for carrying out a gas phase diffusion process includes a reaction vessel (3) enclosing a reaction chamber (1) in which the workpiece (7) is arranged. The apparatus further includes a metal halide generator (9A, 9B, 9C) arranged in the reaction chamber (1), and a heater (5) as well as a cooling device (6) and a thermal conduction arrangement (8) for establishing a temperature gradient between the workpiece (7) and the metal halide generator (9A, 9B, 9C). The method and apparatus produce a diffusion coating having a uniform thickness and a high quality smooth surface, even on large workpiece surfaces.

36 Claims, 2 Drawing Sheets

(A) PREPARATION

* PLACE METAL AND/OR HALIDE-CONTAINING SUBSTANCE INTO DONOR CONTAINERS
* PLACE WORKPIECES INTO REACTION CHAMBER
* FLUSH REACTION CHAMBER WITH INERT GAS

(B) RUN-UP

* INTRODUCE INERT GAS
* HEAT CHAMBER
* COOL THERMAL CONDUCTION ARRANGEMENT AND DONOR CONTAINERS
* PRODUCE METAL HALIDE COMPOUND BY REACTING HALIDE + METAL
* ESTABLISH PHYSICALLY INDUCED (CONVECTION) CIRCULATION

(C) HOLD

* 2 TO 20 HOURS
* 1000°C TO 1200°C

(D) RUN-DOWN

* COOL DOWN
* FLUSH WITH INERT GAS

FIG. 2

METHOD AND APPARATUS FOR GAS PHASE DIFFUSION COATING OF WORKPIECES MADE OF HEAT RESISTANT MATERIAL

PRIORITY CLAIM

This application is based on and claims the priority under 35 U.S.C. §119 of German Patent Application 197 30 007.3, filed on Jul. 12, 1997. The entire disclosure of German Patent Application 197 30 007.3 is incorporated herein by reference.

FIELD OF THE INVENTION

The invention relates to a method and an apparatus for applying a coating material by means of a gas phase diffusion process, onto workpieces made of a heat resistant material.

BACKGROUND INFORMATION

It is known to use diffusion coating processes to apply a coating onto a workpiece, in order to improve the surface characteristics or properties of the workpiece, such as the wear resistance and the corrosion resistance thereof. The workpiece may typically consist of an Ni, Co, or Fe based alloy, while the coating layer applied by the diffusion coating process typically comprises Al, Cr or Si, for example.

In the prior art, diffusion coating processes are known in which the coating is applied by means of a powder pack in which the workpiece is embedded for carrying out the process. The coating material is to be transported and applied onto the workpiece from the powder pack by a vapor phase transport, and also possibly by some degree of liquid phase transport, within the powder pack. Such processes are typically known as "pack cementation" or "pack diffusion" processes. For example, U.S. Pat. No. 3,667,985 discloses such a process for applying a coating of AlTi, and U.S. Pat. No. 3,958,047 discloses such a process for applying a coating of Cr. These processes are basically suitable for coating workpieces made of heat resistant alloys in a uniform manner with a coating having a high proportional content of Al or Cr.

However, all of these known powder pack processes suffer certain process dependent disadvantages. Namely, for example, the maximum size of the powder pack, and thus the maximum size of the workpiece or workpieces, is limited due to problems of thermal conduction for forming a uniform coating layer. Furthermore, the source or donor powder in the powder pack undergoes sinter-bonding onto the surface of the workpiece, and/or otherwise forms an unacceptable roughness of the surface of the workpiece due to embedding of the powder in the coating layer. The handling of the powder is environmentally problematic due to the emission of dust and the like and the problems involved in breaking down and disposing or recycling the fractional powder mixtures.

Certain processes for carrying out diffusion coating without using a powder pack are also known, for example as disclosed in European Patent Publication 0,480,867 A2 and British Patent Publication 1,135,015. Both of these known processes, however, suffer the disadvantage that the reactions for forming the donor or source gas and for achieving the deposition, are carried out in a thermodynamically inefficient or disadvantageous manner, due to the structural arrangement of the apparatus, and the geometric arrangement of the workpiece and the donor source within the apparatus. A further disadvantage of these known coating processes in comparison to the powder pack processes, is that the coating layer has a smaller thickness and/or a smaller proportional content of the diffused elements. Another disadvantage of these known methods is that the circuit arrangement of the donor gas source before or upstream of the reaction chamber requires the use of various interference-sensitive auxiliary apparatus for achieving a gas mixture that is properly reactable.

SUMMARY OF THE INVENTION

In view of the above, it is an object of the invention to provide a method for gas phase diffusion coating of the above mentioned general type, which is improved in such a manner as to be able to achieve a uniform diffusion coating layer even on large workpiece surface areas. A further object of the invention is to provide an apparatus for carrying out the method. The invention also aims to avoid or overcome the disadvantages of the prior art, and to achieve additional advantages, as apparent from the present description.

The above objects have been achieved in a gas phase diffusion coating method according to the invention, wherein the coating material is transported in the form of a metal halide compound, from a coating material source onto the workpiece by means of a metal halide circulation flow. According to a further preferred feature of the invention, the metal halide circulation flow is a physically induced circulation that is established by providing a temperature gradient between the coating material source and the workpiece. The physically induced metal halide circulation flow may be further supported or reinforced by a chemical transport reaction.

The inventive method avoids the pack arrangement of a source material, such as a powder pack, in which the workpiece is embedded. The invention also avoids the need of a constant supply flow of an activator gas for flowing the metal halide compound coating material from a remote source to the workpiece. Namely, the coating material source is located within the same reaction chamber with the workpiece, but not in contact with the workpiece, whereby the circulation flow carries the coating material from the source to the workpiece.

Furthermore, the invention achieves the following essential advantages. The method according to the invention makes it possible to achieve uniform, flat and smooth surface coatings having a high surface quality, whereby the coating layer may have a large coating thickness and a high boundary or barrier layer content of the elements that are to be diffusion transported. Moreover, the inventive method is able to apply such surface coatings even onto large-size or large-volume work pieces.

Further according to the invention, the metal halide compound is formed or generated in the coating material source, which contains a corresponding metal. Advantageously, the metal halide compound may be formed by introducing a halide-containing gas into the metal-containing coating material source. Alternatively, it is particularly advantageous if the metal halide compound is formed via a decomposition reaction of a halide-containing solid body that is contained in the coating material source. Preferably, the solid body contains the halide in the form of a powder. Further advantageously, the coating material source contains the metal in the form of a powder or a granulate.

In order to physically induce the circulation flow as mentioned above, a particularly advantageous embodiment of the invention provides for the formation of the temperature gradient between the coating material source and the workpiece that is to be coated. Specifically, the workpiece is at a higher temperature than the coating material source. The specified temperature gradient can advantageously be achieved by arranging the workpieces and the coating material source in a heated reaction vessel, and then withdrawing or removing heat from the coating material source in order to establish the required temperature gradient. The metal halide circulation flow is advantageously carried out as a closed circulation flow between the coating material source and the workpiece, whereby the closed circulation flow may preferably be driven by thermal convection.

The coating process is preferably carried out in an inert gas atmosphere at an elevated temperature, whereby the inert gas atmosphere preferably contains argon and/or hydrogen gas. Preferably, the inert gas atmosphere is generated or formed while heating-up the system to the required elevated temperature. It is especially advantageous, if the inert gas being provided to the system during the heating phase comprises argon at lower temperatures, for example up to about 700° C., and instead comprises hydrogen at higher temperatures, for example over 700° C. The inert gas atmosphere advantageously contains less than 100 ppm oxygen and less than 100 ppm of water vapor. Advantageously, the coating process is carried out at an elevated temperature of about 1000° C. to about 1200° C., and more preferably between 1080° C. and 1140° C.

The metal comprises an elemental or molecular substance or a corresponding mixture of substances that is combinable with a halide to form a metal halide compound. Advantageously, the metal substance comprises Al, Cr, Si, or mixtures or compounds thereof. The metal substance or metal substance mixture is preferably provided in the form of a granulate or a powder. In this context it is especially advantageous if the granulate or the powder contains a halide in the form of a powder-form or granular-form solid body.

The above objects have further been achieved by an apparatus for gas phase diffusion coating of workpieces, and especially workpieces made of heat resistant materials, according to the invention, wherein the apparatus includes a heatable reaction vessel enclosing a reaction chamber for receiving the workpieces to be coated therein, an arrangement for producing a metal halide compound, and an arrangement for generating or causing a temperature gradient between the workpiece and the arrangement for producing the metal halide compound.

According to particular preferred details of the invention, the arrangement for producing the metal halide compound at least includes a donor container that receives therein a metal substance that serves for producing the metal halide compound. Advantageously, an apparatus for supplying a halide-containing gas to the donor container is also provided.

Further according to the invention, the apparatus or arrangement for generating the temperature gradient advantageously comprises a cooling apparatus that is thermally coupled to the arrangement for producing the metal halide compound. Preferably, the cooling apparatus is cooled by a cooling gas. Particularly, it is advantageous that the cooling apparatus comprises a lamellae arrangement or a tube arrangement through which the cooling gas flows. Preferably, the cooling apparatus is thermally coupled with the arrangement for producing the metal halide compound by a thermal conduction arrangement.

According to further details of the invention, the apparatus preferably further comprises a retort container enclosing a retort chamber which surrounds the reaction vessel, a heating arrangement for heating the retort container and therewith the reaction vessel, and a semi-gas permeable sealing arrangement arranged between the retort chamber and the reaction chamber within the reaction vessel, for selectively releasing excess gases from the reaction chamber into the retort chamber. Preferably, the semi-gas permeable seal arrangement is formed by a labyrinth or open-pored hollow space or passage arrangement in the wall of the reaction vessel.

According to the invention, it is especially advantageous if a plurality of donor containers are provided, of which at least one donor container is maintained at a first low temperature level, and at least a second and/or third donor container is held at a higher temperature level, whereby these temperature levels of the donor containers are all lower than a temperature level of the workpiece that is to be coated. In this context, the various temperature levels of the donor containers are advantageously established by providing different degrees of thermal coupling between these respective donor containers and the cooling apparatus, by means of the thermally conducting arrangement.

BRIEF DESCRIPTION OF THE DRAWINGS

In order that the invention may be clearly understood, it will now be described in connection with an example embodiment, with reference to the drawings, wherein:

FIG. 2 is a schematic flow diagram illustrating exemplary steps in carrying out the gas phase diffusion coating method of the invention.

Figure 1:
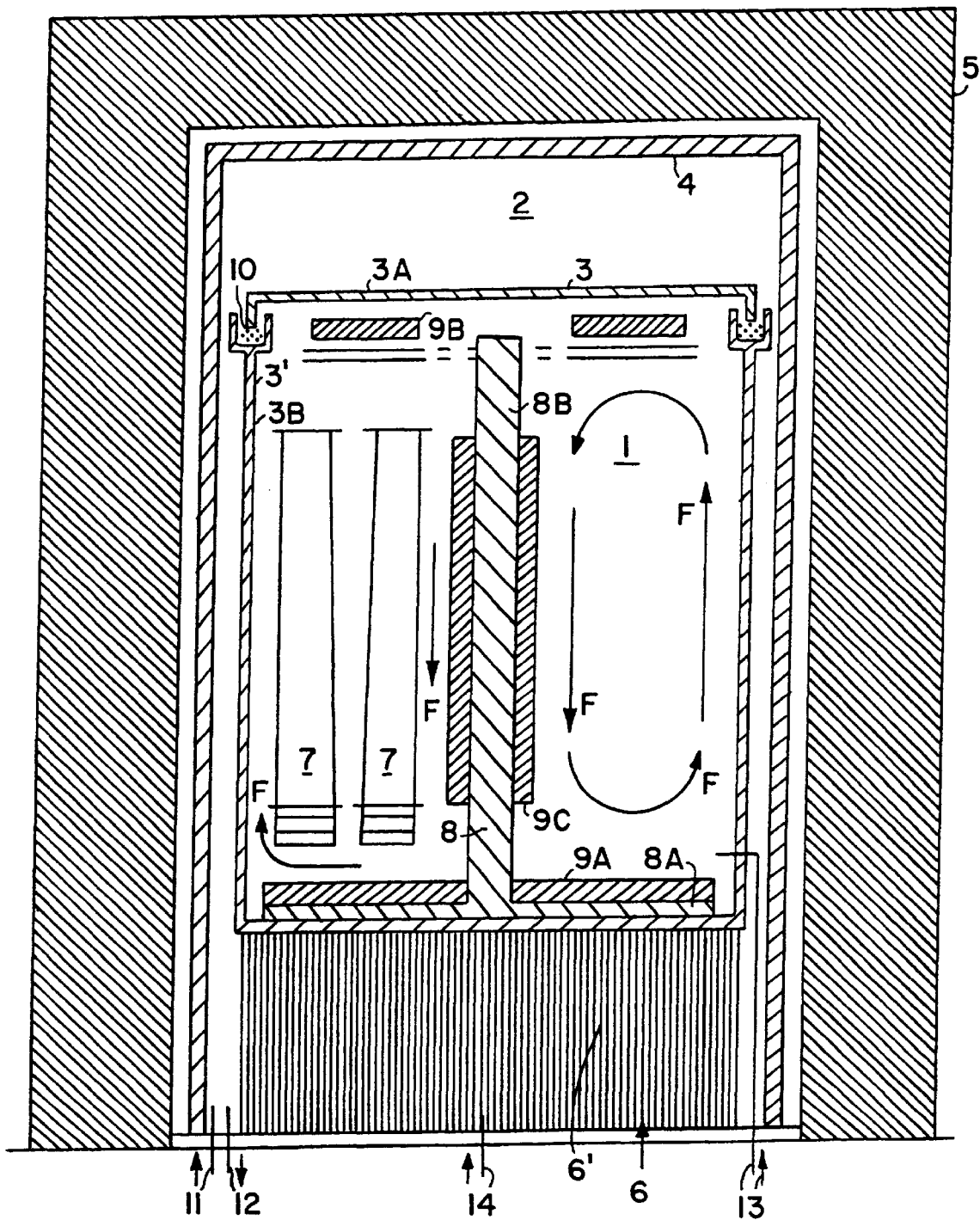
FIG. 1 is a schematic cross-section through an apparatus for carrying out a method of gas phase diffusion coating of workpieces made of heat resistant material with a coating material, according to the present invention.

DETAILED DESCRIPTION OF PREFERRED EXAMPLE EMBODIMENTS AND OF THE BEST MODE OF THE INVENTION

FIG. 1 is a schematic cross-section through an apparatus for carrying out a gas phase diffusion coating method according to the invention. The apparatus includes a reaction vessel 3 enclosing therein a reaction chamber 1, in which the gas phase diffusion coating process will take place. The reaction vessel 3 is surrounded by a retort container 4. Namely, the reaction vessel 3 is arranged within a retort chamber 2 enclosed within the retort container 4, such that the retort chamber 2 at least partially surrounds the reaction vessel 3. In turn, the retort container 4 is surrounded by a heating system 5, which is embodied as an oven or furnace, including its associated heating members, insulation, and the like.

A plurality of workpieces 7 that are to be coated, are arranged in the reaction chamber 1. In the illustrated embodiment, two turbine blades 7 are shown schematically as examples of the workpieces 7. An arrangement for producing a metal halide compound comprises a plurality of donor containers 9A, 9B and 9C, which are arranged in various locations within the reaction chamber 1, as explained more specifically below. A cooling arrangement 6 is situated underneath and on the bottom side of the reaction vessel 3. The cooling arrangement 6 comprises a plurality of thermally conducting lamellae or tubes 6'. A cooling gas is introduced into the cooling arrangement 6 through a cooling gas inlet line or conduit 14, and is then caused to flow through the lamellae or tubes 6' of the cooling arrangement 6.

A thermal conduction arrangement 8 is arranged in thermally conducting contact with the cooling arrangement 6 via the floor or bottom of the reaction vessel 2. The thermal conduction arrangement 8 includes a floor plate or base plate 8A and a vertically standing member 8B, which may simply be thermally conducting metal members or may include heat pipe passages or the like therein, for example. At least one or a plurality of first donor containers 9A are thermally coupled to the base plate 8A of the thermal conduction arrangement 8, and at least one or preferably a plurality of third donor containers 9C are thermally coupled with the vertically standing member 8B of the thermal conduction arrangement 8. For example, respective third donor containers 9C are arranged on two opposite sides of the vertically standing member 8B, and respective first donor containers 9A are arranged on the base plate 8A on opposite sides of the vertically standing member 8B. A plurality of second donor containers 9B are arranged in the upper area of the reaction chamber 1 near the top wall or cover of the reaction vessel 3. The donor container 9B may be supported on a shelf or grid that is in partial contact with the vertical member 8B of the thermal conduction arrangement 8, to establish a lesser thermal coupling therewith as compared to the containers 9A and 9C. Alternatively, the container 9B may be left unconnected to the thermal conduction arrangement 8.

The heating system 5 operates to heat the reaction chamber 1 from room temperature (e.g. 20 to 25° C.) up to an elevated process temperature, indirectly through the reaction vessel 3 and its surrounding retort container 4 with its retort chamber 2 enclosed therein. Simultaneously, the cooling gas flowing through the cooling arrangement 6 directly cools the cooling arrangement 6, and in turn further cools the base plate 8A of the thermal conduction arrangement 8, through the thermally conducting floor of the reaction vessel 3, and in turn cools the vertically standing member 8B connected to the floor plate 8A. Further, due to the cooling of the thermal conduction arrangement 8, the donor containers 9A and 9C thermally coupled therewith are cooled as well. In this manner, a temperature gradient is established between the workpieces 7 that are to be coated and the donor containers 9A and 9C, whereby particularly the workpieces 7 are at a higher temperature than the donor containers 9A and 9C. This temperature gradient may, for example, involve a temperature difference of up to 30 K or even more, or particularly in the range from 15 K to 30 K.

A semi-gas permeable seal arrangement 10 is provided somewhere in the wall 3' of the reaction vessel 3. Particularly, the seal arrangement 10 in this example embodiment is arranged as a rim seal between a top or cover 3A and the side walls 3B of the reaction vessel 3. The semi-gas permeable seal arrangement 10 has a suitable labyrinth or open-pored tube construction so that it allows excess or expanding gases, and especially lower density reaction gases, to escape out of the reaction chamber 1 through the seal arrangement 10 into the retort chamber 2, while preventing gases from the retort chamber 2 from entering into the reaction chamber 1. A gas inlet line or conduit 11 and a gas outlet line or conduit 12 respectively supply gases to and remove gases from the retort chamber 2. A gas inlet line or conduit 13 supplies gas into the reaction chamber 1. More specifically, the lines or conduits 11 and 12 supply and remove inert gases or reducing gases into and out of the retort chamber 2, while the line or conduit 13 supplies inert gases, reducing gases or halide-containing gases into the reaction chamber 1.

As schematically indicated in FIG. 2, the gas phase diffusion coating process carried out in the apparatus of FIG. 1 can be conceptually separated, in time sequence, into four phases, namely a preparation phase A, a run-up phase B including heating the chamber while introducing an inert gas, a holding phase C involving maintaining and continuing the process conditions, and a run-down phase D involving cooling down and flushing the chamber with inert gas.

At the start of the process, in the preparation phase A, a suitable donor metal, optionally further containing or mixed with a halide-containing substance, is placed into the donor containers 9A, 9B and 9C. It is also possible that the metal is placed in some of the containers, such as 9A and 9C, while the halide-containing substance is placed into other ones of the containers, such as 9B. Preferably, the metal and/or the halide-containing substance are provided in the form of respective powders, or as a powder-form solid body, whereby the halide-containing substance and the metal may be intermixed together. Somewhat larger grains or particles may be used rather than a powder.

The workpieces 7 are placed into the reaction chamber, such that all of the surface areas to be coated are exposed, for example the workpieces 7 are hung from respective hangers in the reaction chamber 1. Next, the reaction chamber 1 and the retort chamber 2 are flushed out with an inert gas at room temperature, so as to flush and exclude the normal air atmosphere out of the chambers, until the oxygen concentration and the water vapor concentration in the chambers is less than 100 ppm. Argon and/or hydrogen gas may be used, for example, as the inert flushing gas.

Next, in the run-up phase B, the heating system 5 is activated to heat the reaction chamber 1 from room temperature up to an elevated reaction temperature in the range from about 1000° C. to about 1200° C., and preferably in the range from 1080° C. to 1140° C. During at least the beginning of the temperature increasing process, inert gas is supplied into the reaction chamber. While heating the chamber 1, the cooling gas is flowed through the cooling arrangement 6, so as to cool the thermal conduction arrangement 8 and the donor containers 9A and 9C thermally coupled therewith, i.e. mounted thereon. This combined heating and cooling establishes a temperature gradient as will be discussed further below.

Once a necessary reaction temperature is reached, a reaction takes place at least in the donor containers 9A for producing the metal halide compound or compounds that are responsible for the coating deposition process. Specifically, this is achieved either by introducing a halide-containing gas into the reaction chamber 1, such that this gas reacts with the metal provided in the donor containers 9A, or by a decomposition reaction of the halide-containing substance that is provided together with the metal in one or more of the donor containers 9A, 9B and 9C. The provided halide reacts with the metal, to produce the necessary metal halide compound. Example reactions for the formation of such metal halide compounds are:

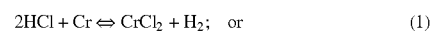

$$2HCl + Cr \Leftrightarrow CrCl_2 + H_2; \quad \text{or} \tag{1}$$

$$AlF_3 + 2Al \Leftrightarrow 3AlF \tag{2}$$

Excess HCl and $H_2$, which are less dense gas compounds in comparison to the metal halide compounds, escape from the reaction chamber 1 by naturally buoying to the top of the chamber and then exiting from the chamber 1 through the semi-gas permeable seal arrangement 10.

Once established, the above reaction conditions are maintained in a holding phase C for a duration of two to twenty hours as necessary for achieving the desired coating thickness. Due to the above mentioned temperature gradient between the higher temperature workpieces and outer walls of the reaction vessel 3 on the one hand, and the lower temperature thermal conduction arrangement 8 and donor containers 9A and 9C on the other hand, a thermal convection flow pattern of the gases is established within the chamber 1. Specifically, due to the different temperatures, the gas will have different local densities respectively near the workpieces 7 and near the thermal conduction arrangement 8.

As a result, a closed-loop gas circulation flow F is established by the metal halide compounds and other gases rising along the hot outer walls 3B of the reaction vessel 3 and then falling along the cooler vertically standing member 8B of the thermal conduction arrangement 8 in the area of the center of the reaction chamber 1. Thus, the gases are continuously circulated over the workpieces 7 and then again over the metal donor containers 9C and 9A. In this manner, a continuous closed-loop gas circulation flow F is physically induced by the temperature gradient established by the cooling of the thermal conduction arrangement 8.

Additionally to the thermal convection effect, the gas circulation flow F is reinforced by the chemical reactions taking place, namely the deposition reaction of the metal halide compounds along the surfaces of the workpieces 7 and the metal halide formation reactions taking place in the donor containers 9C and 9A. In this context, representative examples of the deposition reaction taking place at the workpiece are, for example:

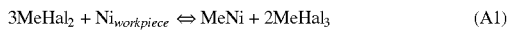  (A1)

  (A2)

  (B1)

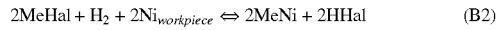  (B2)

The HHal produced by the reactions B1 and B2 is reacted and bound in the metal donor containers 9B, whereby the trivalent metal halide compounds are simultaneously reacted in the donor containers to instead form univalent and bivalent metal halide compounds in the induced circulation flow process. The different densities of the gaseous products respectively given off by the various reactions serve to reinforce the circulation flow.

The reactions of the univalent and bivalent metal halides are supported or even driven by the lower temperatures prevailing in the area of the donor containers, since these reactions are exothermic and are therefore thermodynamically favored at lower temperatures. In contrast, the deposition reactions, which are endothermic or substantially less exothermic than the above described reactions, are thermodynamically favored and supported at the surfaces of the workpieces 7 due to the comparatively higher temperatures prevailing there.

In this manner, a physically induced closed-looped circulation flow process is established within the reaction chamber 1, and provides thermodynamically favorable conditions for high proportions or high activities of the metal-depositing metal halide compounds with close contact or proximity between the donor and acceptor of the metal that is to be deposited. For these reasons and in this manner, it is possible to achieve a very uniform diffusion coating having high boundary layer contents of, for example, Al or Cr over the entire surfaces of the workpieces 7.

After the process conditions and especially the process temperature have been maintained for a holding time of from two to twenty hours, and preferably four to fifteen hours, the heating is discontinued in a run-down phase D, and an inert gas is supplied into the reaction chamber 1 to flush out any reactable halide compounds and to cool down the chamber and the workpieces.

Two particular examples of the above described gas phase diffusion process will now be described.

EXAMPLE 1

In this example, the workpieces 7 are turbine blades made of the alloy MAR-M-247, having a length of 710 mm. These turbine blades were subjected to the gas phase diffusion process according to the invention, to provide a chrome layer having a thickness of 70 $\mu$m on the surfaces of the blades. Specifically, ten to twenty-four turbine blades are charged into the reaction chamber 1. 54 kg of Cr granules uniformly mixed with 540 g of ammonium chloride are supplied into the metal donor containers 9A, 9B and 9C. The reaction chamber 1 and the retort chamber 2 are flushed out for at least 30 minutes using argon at a flow rate of 2 m$^3$/h. Heating is carried out from room temperature to 1140° C. over a time of 2.5 hours, whereby argon is introduced at a rate of 0.5 m$^3$/h until a temperature of 700° C. is reached. Once the system is at high temperature, a temperature difference or gradient between the work pieces 7 and the metal donor containers 9A, 9B and 9C is in a range up to 30 K. The process is continued during a holding time of 14 hours. As a result of carrying out the process according to Example 1, the diffusion coating layer on the surfaces of the workpieces typically has a chromium content of 28 wt. % and a thickness of 70 $\mu$m.

EXAMPLE 2

In Example 2, the workpieces comprise turbine blades made of a nickel based alloy Rene 80, which are to be coated according to the method of the invention with an aluminum diffusion layer having a thickness of 80 $\mu$m. Up to thirty-two of the turbine blades are arranged in one plane within the reaction vessel. 48 kg of AlCr granules having 50 wt. % Al are mixed with 320 g of AlF$_3$ as a donor of the halogen, and this mixture is placed into the donor containers 9A, 9B and 9C. The reaction chamber 1 is heated, and during the heating up to 700° C. the reaction chamber is flushed with 2 m$^3$/h of argon, and in the temperature range from 700° C. to 1000° C. the reaction chamber 1 is flushed with H$_2$. The diffusion coating process is carried out at a high temperature of 1080° C. for a holding time of 4.5 hours. A coating layer comprising 33 wt. % Al and having a layer thickness of 65 to 80 $\mu$m was formed on the surfaces of the workpieces.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. Whenever the term "about" is used in this specification, it indicates the usual deviation from a stated nominal value as typically occurs in practice in this field.

What is claimed is:

1. A method of forming a coating on a workpiece by gas phase diffusion, comprising the following steps:
   a) arranging both a workpiece and a first metal halide compound source within the same reaction chamber in a reaction vessel;
   b) establishing a temperature gradient between said workpiece and said source such that said workpiece is at a higher temperature than said source;

c) establishing in said reaction chamber a closed loop circulation flow of a gas containing a metal halide compound in a circulation loop between said source and said workpiece and back to said source by means of thermal convection of said gas driven by said temperature gradient, so as to convey said metal halide compound in said gas from said source to said workpiece; and d) reacting said metal halide compound at said workpiece to form said coating on said workpiece.

2. The method according to claim 1, wherein said workpiece consists of a heat resistant material.

3. The method according to claim 1, wherein said temperature gradient causes said gas to have different first and second relative densities respectively proximate said source and said workpiece and thereby drives said closed loop circulation flow.

4. The method according to claim 1, wherein said establishing of said closed loop circulation flow further comprises reinforcing said circulation flow by a first chemical reaction taking place at said source and a second chemical reaction taking place at said workpiece.

5. The method according to claim 1, further comprising carrying out a first chemical reaction at said source to form said metal halide compound, and wherein said reacting of said metal halide compound to form said coating comprises a second chemical reaction taking place at said workpiece to at least partially decompose said metal halide compound and deposit a metal contained therein onto said workpiece to form said coating.

6. The method according to claim 1, wherein said step a) is carried out so that said source is not in contact with said workpiece.

7. The method according to claim 1, wherein said source contains a metal, and further comprising producing said metal halide compound by reacting said metal in said source.

8. The method according to claim 7, further comprising introducing a halide-containing gas into said source, and wherein said reacting of said metal in said source comprises reacting said metal in said source with said halide-containing gas.

9. The method according to claim 7, wherein said source further contains a halide-containing solid material, and further comprising producing a halide by carrying out a decomposition reaction of said halide-containing solid material, and wherein said reacting of said metal in said source comprises reacting said metal with said halide.

10. The method according to claim 9, wherein said halide-containing solid material is in the form of a powder.

11. The method according to claim 7, wherein said metal is in the form of at least one of a powder and a granulate.

12. The method according to claim 1, wherein said establishing of said temperature gradient comprises heating said reaction vessel and removing heat from said source.

13. The method according to claim 1, further comprising providing an inert gas in said reaction chamber to form an inert gas atmosphere around said workpiece, wherein said establishing of said temperature gradient comprises heating said atmosphere and said workpiece to an elevated temperature, and wherein said reacting of said metal halide compound comprises carrying out a deposition reaction of said metal halide compound depositing said coating on said workpiece in said inert gas atmosphere at said elevated temperature.

14. The method according to claim 13, wherein said inert gas comprises at least one of argon and hydrogen gas.

15. The method according to claim 13, further comprising producing said inert gas during said heating of said atmosphere and said workpiece to said elevated temperature.

16. The method according to claim 13, wherein said providing of said inert gas comprises providing argon as said inert gas in a first lower temperature range during said heating, and providing hydrogen as said inert gas in a second higher temperature range during said heating.

17. The method according to claim 16, wherein said first lower temperature range is from room temperature to 700° C., and said second higher temperature range is above 700° C.

18. The method according to claim 13, wherein said inert gas atmosphere contains less than 100 ppm oxygen and less than 100 ppm water vapor.

19. The method according to claim 1, further comprising heating at least said workpiece to said higher temperature in a range from about 1000° C. to about 1200° C., and carrying out said reacting of said metal halide compound to form said coating on said workpiece at said higher temperature.

20. The method according to claim 19, wherein said higher temperature is in a range from 1080° C. to 1140° C.

21. The method according to claim 1, wherein said source contains a metal substance selected from at least one of a metal elemental substance, a metal molecular substance, and a metal mixture substance, which is adapted to combine with a halide to form said metal halide compound.

22. The method according to claim 21, wherein said metal substance consists essentially of a composition selected from the group consisting of Al, Cr, Si, a compound of at least one of Al, Cr, and Si, and a mixture of at least one of Al, Cr and Si.

23. The method according to claim 21, wherein said metal substance is contained in at least one of a powder and a granulate.

24. The method according to claim 23, wherein said metal substance is contained in said granulate, and said granulate further contains a halide in the form of a powder or granules.

25. The method according to claim 24, wherein said halide comprises at least one of ammonium chloride ($NH_4Cl$) and aluminum fluoride ($AlF_3$).

26. The method according to claim 1, wherein said establishing of said temperature gradient comprises heating said workpiece while simultaneously cooling said source to establish a temperature difference in a range from 15 K to 30 K therebetween.

27. The method according to claim 1, further comprising continuing said reacting of said metal halide compound for forming said coating for a duration in a range from 4 hours to 15 hours, such that said coating has a thickness in a range from 65 $\mu$m to 85 $\mu$m.

28. The method according to claim 1, further comprising carrying out a reaction at said first source in which a trivalent metal halide is converted to said metal halide compound, which comprises at least one of a bivalent metal halide and a univalent metal halide.

29. The method according to claim 28, wherein said metal halide compound consists essentially of said bivalent metal halide.

30. The method according to claim 28, wherein said metal halide compound consists essentially of said univalent metal halide.

31. The method according to claim 28, wherein said metal halide compound consists essentially of said bivalent metal halide and said univalent metal halide.

32. The method according to claim 1, further comprising selectively releasing from said reaction chamber an excess amount of a relatively less dense gas component of said gas.

33. The method according to claim 1, further comprising providing a second metal halide compound source, and establishing and maintaining said first and second sources respectively at different first and second temperatures.

34. The method according to claim 1, wherein said establishing of said temperature gradient comprises removing heat from said source by conveying said heat from said source to a heat exchange arrangement, flowing a cooling gas through said heat exchange arrangement, and transferring said heat to said cooling gas in said heat exchange arrangement.

35. The method according to claim 34, wherein said establishing of said temperature gradient further comprises heating said reaction vessel.

36. The method according to claim 1, wherein said establishing of said temperature gradient comprises actively cooling said source.

* * * * *